UNITED STATES PATENT OFFICE.

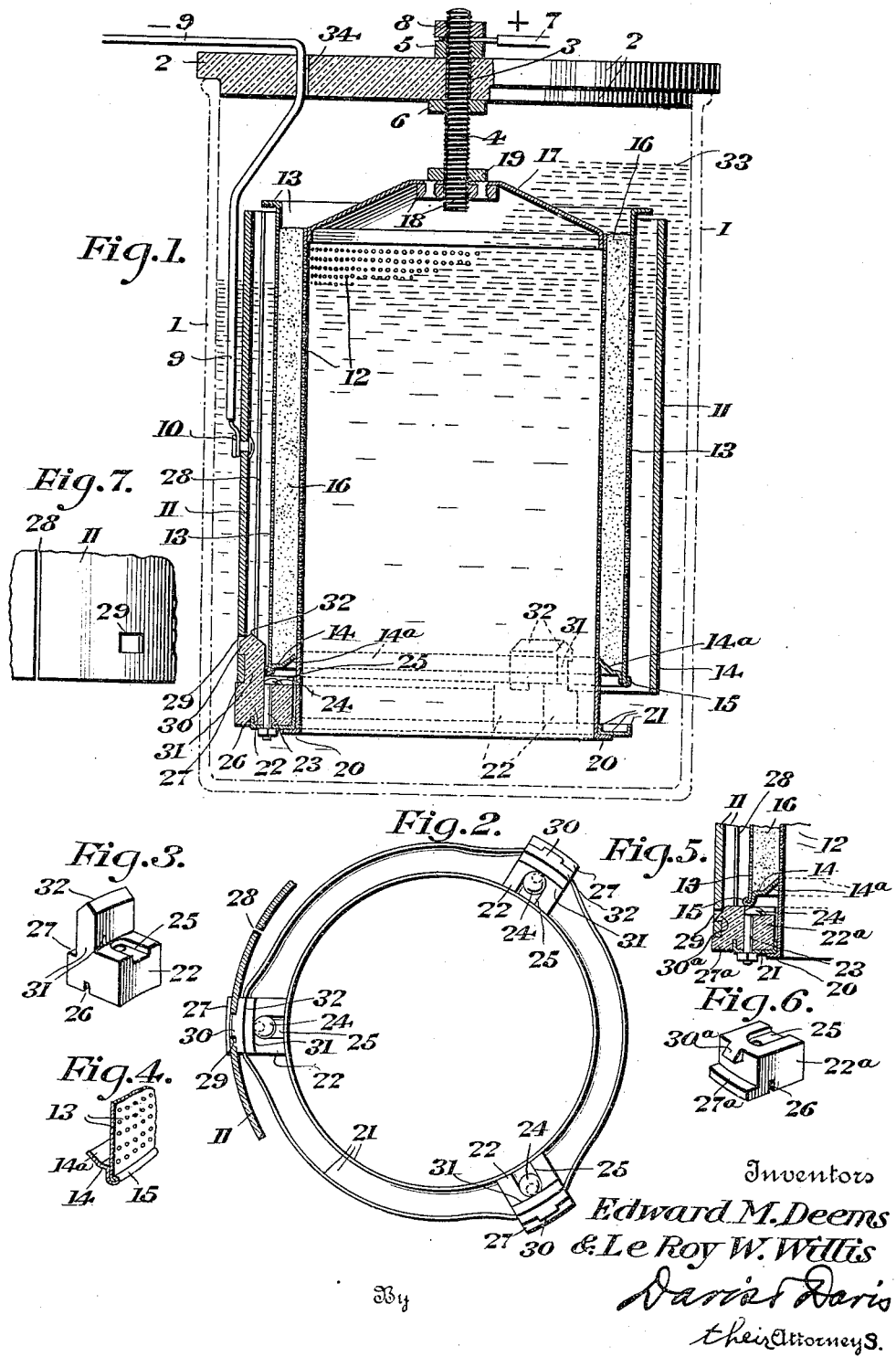

EDWARD M. DEEMS, OF FOREST HILLS, NEW YORK, AND LE ROY W. WILLIS, OF MONTVILLE, NEW JERSEY, ASSIGNORS TO EASTERN SIGNAL & SUPPLY COMPANY, INC., OF NEW YORK, N. Y., A CORPORATION OF NEW YORK.

BATTERY.

1,373,802.     Specification of Letters Patent.     Patented Apr. 5, 1921.

Application filed August 24, 1920. Serial No. 405,610.

*To all whom it may concern:*

Be it known that we, EDWARD M. DEEMS and LE ROY W. WILLIS, citizens of the United States, and residents of Forest Hills, county of Queens, State of New York, and of Montville, county of Morris, and State of New Jersey, respectively, have invented certain new and useful Improvements in Batteries, of which the following is a specification.

This invention relates to improvements in electric batteries, and more particularly to primary batteries of the one-fluid type.

The invention has for its objects to provide a primary battery so constructed as to increase the capacity of the battery, reduce the cost of manufacture and maintenance thereof, and facilitate the assembly and renewal of the parts; to provide an improved construction of anode and means for supporting the same on a non-polarizing cathode in such a way as to permit the employment of a zinc or other anode of the same or substantially the same length as the cathode without danger of the same being accidentally tilted into contact with the cathode; and to provide simple insulating, spacing and locking means for positively but separably holding two long tubular concentric electrodes in fixed relation, said means being located at one end only of the electrodes and obstructing a minimum part of the surfaces of said electrodes.

In the accompanying drawings, Figure 1 is a vertical sectional view of the battery;

Fig. 2 a plan view of the means for supporting the anode on the cathode;

Fig. 3 a perspective view of one of the anode supporting and spacing blocks;

Fig. 4 a detail view showing a part of the anode;

Fig. 5 a fragmentary vertical sectional view showing a slightly modified construction of insulating and spacing block for supporting the zinc anode;

Fig. 6 a perspective view of the supporting and spacing block shown in Fig. 5; and Fig. 7 a fragmentary side elevation of the split zinc anode.

Referring to the drawings by numerals, 1 designates the usual glass or porcelain battery jar and 2 the removable cover of the jar. The cover 2 may be formed of glass, porcelain, vulcanized rubber compound, or other suitable insulating material, and is provided with a central aperture 3. A binding post or threaded metallic battery terminal 4 extends through the aperture 3 and is secured to the jar cover by a pair of clamping nuts 5 and 6 threaded thereon. One line wire 7 is connected with the terminal member 4 by a suitable binding nut 8. The member 4 forms the positive terminal of the battery and the other line wire 9 extends through an aperture 34 in the cover and is connected with a rivet 10 or other suitable fastening device secured to the anode or zinc electrode 11 and constitutes the negative terminal of the battery.

The cathode or negative electrode comprises a tubular metallic casing or cage, consisting of a tubular reticulated or perforated sheet metal inner member 12 and a concentric tubular reticulated or perforated sheet metal outer member 13 removable endwisely from the inner member and having a bottom ring 14 rigidly held thereto by means of a double or lock seam connection 15, or in any other suitable manner. The ring 14 serves as a closure for the lower end of the annular chamber formed by the members 12 and 13, and the inner edge of said ring is preferably turned upwardly to form a scraping edge portion 14ᵃ adapted to scrape all deposits from the outer surface of member 12 and strip all the depolarizing material 16 therefrom when the members 12 and 13 are separated. The depolarizing agent 16 may be copper oxid in flaked or comminuted form, or other suitable material. The inner member 12 is open at its lower end and the upper end thereof is closed by a dome-shaped sheet metal cap 17 welded or otherwise secured at its outer edge to the member. The cap 17 is reinforced or thickened centrally thereof by means of a metal disk 18 riveted thereto, and this thickened central portion of the cap is provided with a threaded aperture into which the post 4 is screwed. A lock nut 19 may be provided for holding the inner member in its adjusted position on the post 4.

The inner member 12 of the cathode is provided at its lower end with an outwardly extending flange 20 on which is seated an annular sheet metal member or ring 21 of channel form, preferably widened laterally at three equidistant points to afford broad supporting surfaces for three blocks 22. The blocks 22 are formed of porcelain or other suitable insulating material and are detachably held to the ring 21 by means of bolts 23. The bolts 23 are preferably formed with eccentrically disposed heads 24 seating in recesses 25 in the tops of the blocks and adapted to prevent rotation of the bolts. Blocks 22 overhang the outer edge of the ring 21 and are formed with grooves 26 adapted to receive the upstanding outer edge of the channel ring. Each block 22 is also provided with a ledge, shoulder or projection 27 along its outer edge on which the lower edge of the tubular zinc anode 11 rests. The zinc anode is preferably split longitudinally as shown at 28 and is provided adjacent its lower end with apertures 29 in which engage locking projections or studs 30 formed on the outer sides of upstanding projections 31 on the blocks 22. The projections 31 serve to positively space the anode from the cathode, and the upper edges of said projections are preferably beveled, as shown at 32, to prevent metallic particles lodging thereon and bridging the space between the anode and cathode.

In the modified construction shown in Figs. 5 and 6 the projections 31 are omitted from the spacing blocks 22ª, and the locking studs 30ª having beveled upper sides are formed on the blocks above the anode supporting ledges 27ª.

With a battery construction as above described it will be obvious that the anode and cathode may be connected to and disconnected from the terminal post 4 while in assembled relation, and may also be withdrawn from the exciting fluid or electrolyte 33 and removed from the jar with the cover as a unit for inspection and cleaning. It will also be observed that the anode may be readily removed and a new anode substituted therefor, and also that the depolarizing material may be readily renewed.

The longitudinal slit 28 which preferably extends from end to end of the zinc anode permits sufficient temporary expansion or yielding of the zinc anode to allow the same to be sprung over the locking projections on the blocks of insulating material, and it will be obvious that after the split zinc anode has been forced down over the beveled upper ends of the locking projections the anode will spring back to its original shape with the studs or locking projections engaging in the apertures around the base of the zinc anode. The distance between the anode supporting ledges on the blocks and the straight bottom edges of the locking lugs is the same as the distance from the lower end of the anode to the lower edge of the apertures in the anode, so that the anode will be tightly interlocked with the blocks and securely held down upon the ledges on the blocks, in such a way, that tilting of the zinc anode relatively to the cathode is impossible even when the battery jar is tilted or subjected to severe shocks.

The improved insulating, spacing and locking means offers a minimum obstruction to the chemical action of the battery as very small blocks may be used, and said spacing and locking means permits the use, without danger of tilting, of a long zinc anode which surrounds the cathode throughout the length of said cathode, thus increasing the capacity of the battery. It has been necessary to employ short zinc anodes in batteries of this type heretofore as no anode supporting means had been devised which was so constructed as to prevent long zinc anodes from tilting into contact with the cathode and short circuiting the battery when the battery jar was tilted or subjected to shocks.

What we claim is:

1. A primary battery comprising a jar, a cover for the jar, an electrode suspended from the cover, a series of blocks of insulating material supported on the electrode around the lower end of said electrode, and a tubular electrode surrounding the first-mentioned electrode in contact with the outer faces of said blocks, said tubular electrode being split longitudinally and provided with apertures adjacent its lower end and said blocks being provided with outwardly extending projections engaged in said apertures.

2. A primary battery comprising a jar, a cover for the jar, an electrode suspended from the cover, a series of blocks of insulating material supported on the electrode around one end of the electrode and provided with outwardly extending projections, and a tubular electrode surrounding the first-mentioned electrode and provided with a series of apertures in which the projections on the blocks are engaged, said blocks being provided with abutments against which the adjacent end of the tubular electrode rests, and the tubular electrode being split longitudinally at one side thereof to permit the same to be sprung on and off the blocks.

3. A primary battery comprising a jar, a jar cover, an electrode suspended from the cover, a series of circumferentially spaced blocks of insulating material supported on the electrode adjacent the lower end of the electrode and provided with outwardly extending projections, and a tubular metallic electrode split longitudinally at one side thereof from end to end and provided with a series of apertures adjacent its lower end in which the projections on the block engage, said blocks being provided with abutments below the projections on which the lower end of the split tubular electrode is seated.

4. In a primary battery, the combination of two concentric battery elements the outer one of which is split longitudinally to permit expansion thereof, and spacing means interposed between said elements and supported on the inner element, said spacing means being provided with outwardly extending projections and the split element being provided with openings in which said projections are interlocked.

5. A primary battery comprising a jar, a jar cover, an inner perforated tubular metallic member suspended from the cover and provided at its lower end with an outwardly projecting flange, a ring of channel form seated on said flange and provided at intervals with laterally widened portions, blocks of insulating material secured upon the widened portions of said ring and each provided at its outer edge with a stud and a ledge below said stud, an outer perforated tubular metallic member supported at its lower edge on said blocks, means carried by said outer member loosely engaging the inner member for supporting a body of depolarizing material between said members, and a tubular electrode surrounding the outer member with its lower edge resting on the ledges on said blocks, said electrode being provided with apertures in which the studs on the blocks engage.

6. A primary battery comprising an electrolyte container, a cover for said container, a cathode suspended from the cover, a laterally expansible anode surrounding the cathode and provided with a series of apertures spaced apart around the same, and a series of blocks supported on the cathode against downward movement and spaced apart around the cathode, each of said blocks having a portion thereof interposed between the anode and cathode and provided with an outwardly extending projection engaging in one of the apertures in the anode, said blocks being formed with abutments below said projections upon which the lower edge of the anode is seated.

In testimony whereof we hereunto affix our signatures.

EDWARD M. DEEMS.
LE ROY W. WILLIS.